United States Patent [19]

Wolf

[11] 4,145,088
[45] Mar. 20, 1979

[54] COMBINED POWER AND MANUALLY ACTIVATED BRAKE SYSTEM

[75] Inventor: Peter Wolf, Baroda, Mich.

[73] Assignee: Lambert Brake Corporation, St. Joseph, Mich.

[21] Appl. No.: 832,557

[22] Filed: Sep. 12, 1977

[51] Int. Cl.² ............................................. B60T 13/18
[52] U.S. Cl. ........................................ 303/2; 303/9
[58] Field of Search ................. 60/567, 582, 584, 594, 60/427, 437; 303/2, 6 A, 6 R, 9, 10, 52

[56] References Cited

U.S. PATENT DOCUMENTS

| | | | |
|---|---|---|---|
| 3,114,581 | 12/1963 | Tuszynski | 303/2 |
| 3,208,802 | 9/1965 | Thirion | 303/52 X |
| 3,639,008 | 2/1972 | MacDuff | 303/10 |
| 3,977,732 | 8/1976 | Grosseau | 303/52 X |

*Primary Examiner*—Duane A. Reger
*Attorney, Agent, or Firm*—Olson, Trexler, Wolters, Bushnell & Fosse, Ltd.

[57] ABSTRACT

A brake system is disclosed which comprises a primary fluid power brake subsystem and a secondary or back-up brake subsystem. The primary brake system is of the "power brake" type, and includes a power brake valve having a housing defining an elongate bore. A bi-ended rod extends through the housing end wall to be slid between spaced apart first, second and third positions. That end of the rod which is inside the housing is affixed to a reaction piston. The reaction piston cooperates with an annular piston, also carried within the bore, to have fluid flow through the valve and raise fluid pressure within a collapsible chamber defined by the bore. When the rod is partially pulled out of the valve housing, this high pressure fluid is directed to vehicle brakes to cause primary braking action. Should the primary system fail in some respect, rod pull-out action operates to energize a secondary or back-up brake system. Secondary brake system energization is caused by a brake controller which is connected to the primary valve rod, and which is also positioned to engage a secondary brake subsystem master cylinder actuator.

15 Claims, 5 Drawing Figures

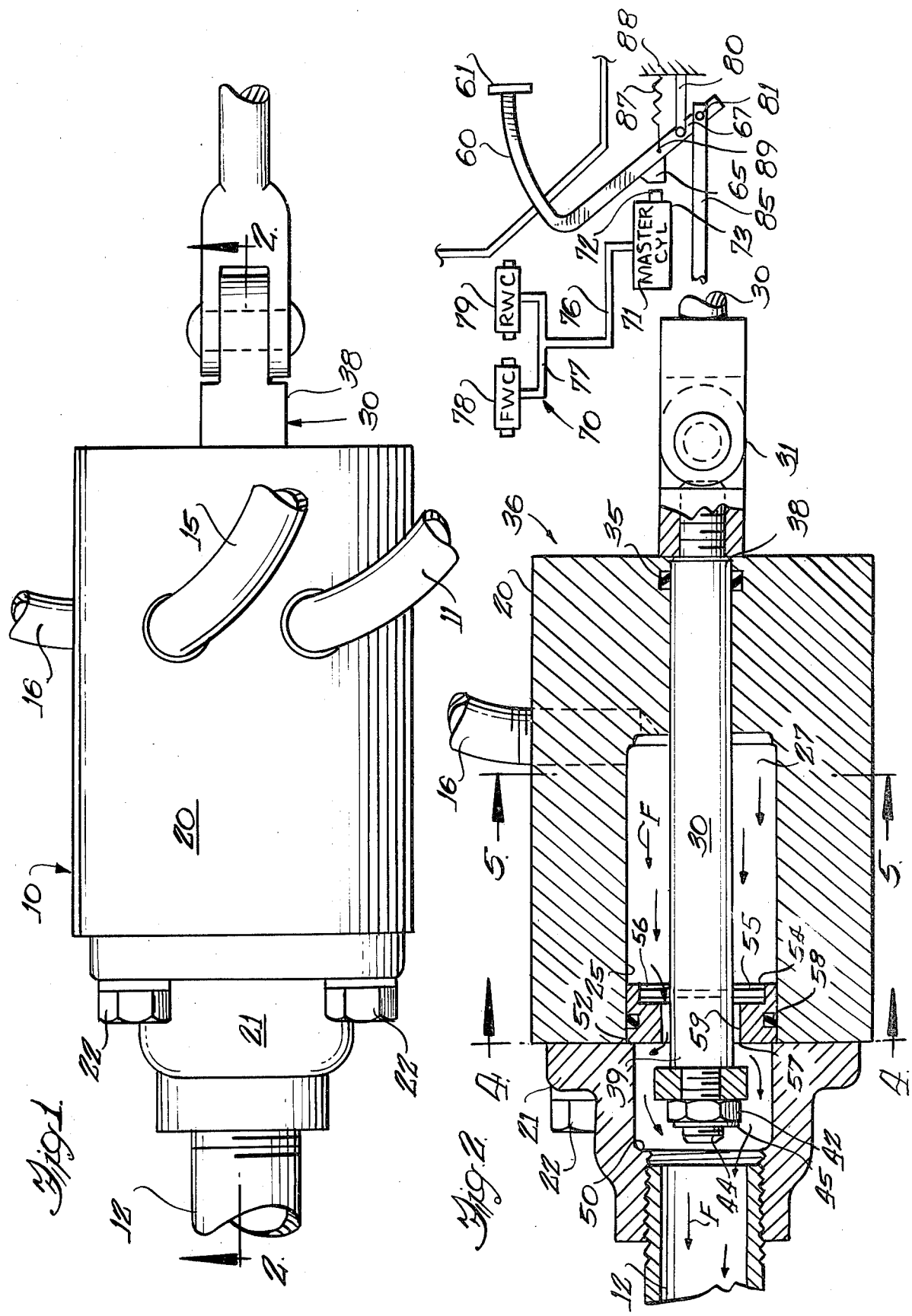

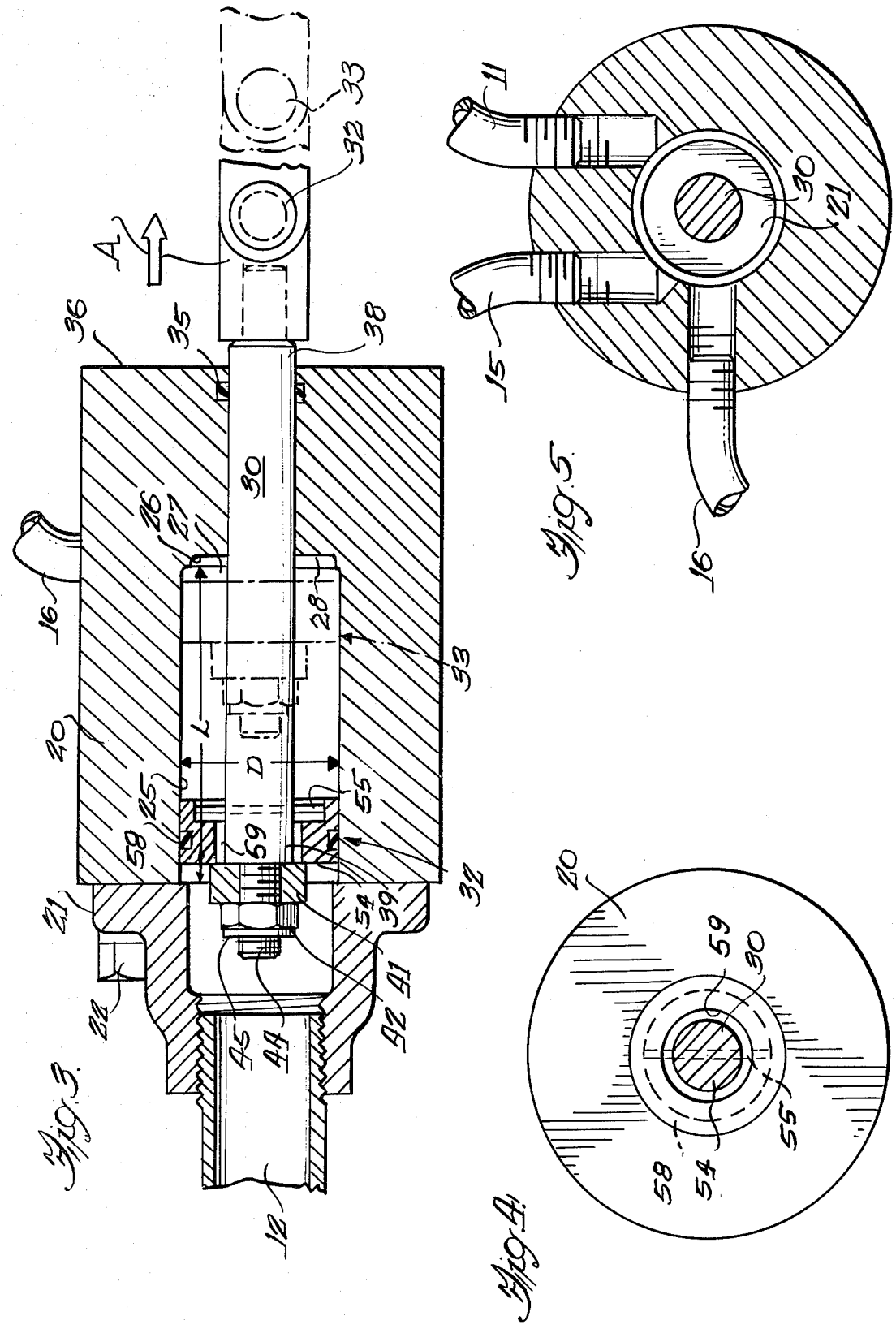

COMBINED POWER AND MANUALLY ACTIVATED BRAKE SYSTEM

BACKGROUND OF THE INVENTION

This invention relates generally to vehicle brake systems, and more particularly concerns a brake system which includes a primary service brake system and a back-up emergency brake system and interconnecting devices for actuating the brake systems when required.

So-called "power brake" systems have recently added greatly to the effectiveness and ease of operation of brake systems of the types usually provided on automobiles, trucks, and other vehicles. These power brake systems include a power valve which permit even a small, frail operator to bring a large, heavy vehicle to a quick, smooth and safe halt with relatively minimal effort. Some such power brake systems which have met with considerable commercial success include a brake valve of the type found in U.S. Pat. Nos. 3,827,765 and 3,900,229.

Secondary braking systems can be provided, where necessary, to act as back-up or emergency brake systems in the event of damage to or failure of the primary brake system. These secondary systems may be required by law, or may be desirable under conditions involving especially heavy or rugged use. However, some secondary systems are not fully independent of the primary system, and may require special action from the driver for energization.

It is the general object of the present invention to provide a brake system having a primary or service brake subsystem operated from a power valve, and a secondary or back-up emergency brake subsystem which will provide braking action almost completely independently of the primary brake system.

It is another object of the invention to provide such a brake system in which secondary brake subsystem actuation occurs in conjunction with the primary valve and related mechanism in an automatic, smooth and direct way when necessary.

Yet another object is to provide such a brake system in which secondary brake subsystem actuation occurs without requiring specialized action by the vehicle brake operator. A related object is to provide such a brake system in which the secondary subsystem is energized by the operator through the primary system actuator even though the brake operator may not even recognize the fact that secondary subsystem actuation is necessary.

Still another object is to provide a brake system of the type described which provides a positive indication through the primary actuator that the secondary subsystem has been energized.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a top plan view of a power-type brake control valve and associated parts of a primary brake system of the type described;

FIG. 2 is a sectional view taken substantially in the plane of line 2—2 in FIG. 1 and showing related portions of the brake system when the system is in a brake inactive, freewheeling condition;

FIG. 3 is a sectional view taken substantially in the plane of line 2—2 in FIG. 1 but showing alternative positions of portions of the brake valve mechanism when the brake system is actuated;

FIG. 4 is a sectional view taken substantially in the plane of line 4—4 in FIG. 2; and FIG. 5 is a sectional view taken substantially in the plane of line 5—5 in FIG. 2.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more specifically to FIGS. 1—3, there is shown a brake system including a power brake master valve 10. It is contemplated that brake fluid of a liquid type will be continuously supplied to a brake inlet line 11 and accompanying port from a source of pressurized fluid such as a brake fluid pump (not shown). When the brakes are deactivated, this fluid continually flows in through the inlet port 11, and out of the valve 10 through an outlet port 12 for return to a receiver and, ultimately, the pressurizing pump. When the brakes are to be actuated, the valve 10 is operated as described more fully below, and fluid flow through the outlet port 12 is reduced. Simultaneously, the valve delivers a pressurizing charge of fluid to a brake outlet port 15. This fluid charge actuates the brakes through a primary system of conduits (not shown) in the ususal manner. If desired, one or more additional ports 16 can provide a charge of pressurized fluid to other vehicle components such as a clutch so as to de-clutch or disconnect the driving prime mover engine from the vehicle during such time as the brakes are being applied.

The brake valve 10 itself includes a housing 20 to which is secured a cap 21 by any convenient means such as bolts 22. In the housing 20 is formed an elongate bore 25 closed at one end by an end wall 26. Together with other ports described below, this bore 25 and end wall 26 define an internal collapsible chamber 27. For smooth valve operation, a pocket 28 can be provided at the end wall 26 to permit fluid to be introduced near the end of valve stroke operation so as to return the valve to an original condition.

A bi-ended service or primary valve rod 30 extends through the end wall 26, and can be slid between a first position 31 shown in FIG. 2, a second position 32 shown in FIG. 3, and a third position 33 also shown in FIG. 3. To prevent fluid escape around the sides of the rod 30, a seal 35 can be included at a working end 36 in the housing 20.

A first rod end 38 is disposed outside the housing 20 for connection to mechanisms described below. A second, or piston, rod end 39 is disposed within the bore 25, and this end 39 carries a relatively small reaction piston 41. To secure the reaction piston in place, a security nut 42 can be turned against the reaction piston 41 along threads 44. A safety device such as a cotter pin 45 is here included to insure that the piston 41 is retained upon the rod end 39.

It will be noted that the cap 21 defines a recess 50 having a diameter slightly smaller than the diameter of the adjoining housing bore 25. This difference in diameter magnitude provides an annular stop, shoulder, or seat 52 at the end of the housing 20. Against this seat 52 normally rests an annular piston 54. To limit motion of the annular piston 54 relative to the rod 30, a pin 55 extends radially through the rod 30 and into a relief 56 formed in the piston 54. Fluid leakage around the outside of the piston 54 is discouraged by an appropriate seal 58.

When the primary service brake system is in its normal or brakes-deactivated condition, fluid flows into the elongate housing bore 25 through the inlet port 11 and toward the cap 21 as indicated by the arrows F. Since the reaction piston 41 and the annular piston 54 are not engaged, fluid flows between the rod 30 and the annular piston 54 through an annular flow space 59, thence around the outside of the reaction piston 41, and out of the valve through the outlet port 12.

It will be noted that an orifice 57 is effectively formed between the reaction piston 41 and the annular piston 54. When the rod 30 is drawn in the direction indicated by the arrow A in FIG. 3, the reaction piston 41 is drawn toward the annular piston 54 from the first position 31 indicated in FIG. 2 toward the second position 32 indicated in FIG. 3, thereby restricting or entirely closing off the orifice area 57 shown in FIG. 2, and closing the collapsible chamber 27. As the orifice 57 is closed, the continual introduction of fluid through the inlet port 16 into the chamber 27 raises the internal chamber pressure, and fluid is exhausted through the braking outlet port 15 and any de-clutching or other ports 16. In this way, withdrawal of the valve rod 30 (to the right in FIGS. 1–3) operates to energize the primary braking subsystem and halt the vehicle. It is contemplated that full energization of the primary subsystem will occur as the rod 30 moves from its first position 31 to its second position 32.

As indicated especially in FIG. 2, a brake system controller 60 is connected to the rod 30 for brake energization by rod movement. To move the rod 30 between the described first, second and third positions, the operator depresses an operating element pedal 61 at an operator's station in known manner and thus moves the controller between corresponding first, second and third positions.

In accordance with the invention, a secondary or emergency back-up braking system 70 is provided, and can be actuated by the same controller 60 which is used to actuate the primary braking system valve 10 so as to obviate the need for any specialized action on the part of the vehicle operator should secondary subsystem actuation become necessary. To this end, the secondary brake system 70 includes a master cylinder 71 and an energizing secondary actuator rod 72 extending through a master cylinder wall 73. A piston (not shown) within the master cylinder is connected to the actuator rod 72; when the rod 72 is progressively slid into the cylinder 71, fluid pressure is progressively raised within that master cylinder 71. This pressure rise charges or pressurizes interconnecting lines 76 and 77 and consequently pressurizes brake unit cyliders 78 and 79 so as to provide a progressively increasing braking action.

In further accordance with the invention, this secondary braking system 70 is not energized under normal conditions, and its energization provides a corresponding indication to the operator, by the extra-depressed position of the brake pedal 61, that the secondary brake system has indeed been energized. To this end, a master cylinder-energizing actuator rod 72 is located for engagement by the controller 60 when the power cylinder rod 30 and controller 60 are located at their respective second positions as illustrated in FIG. 3. As the operator further depresses the brake pedal 61, and the power cylinder rod 30 and controller 60 progressively move from their second to their third positions, the master cylinder rod 72 is progressively forced into the master cylinder 71, thereby generating and then increasing the braking pressure delivered to the brake units 78 and 79.

It is a feature of the invention that the power valve 10 accommodates the necessary action as the controller 60 energizes the secondary braking system, even after the primary subsystem has been fully energized, by moving the controller 60 and valve rod 30 from their first to their second positions. To this end, the valve bore 25 is elongated sufficiently to permit the rod 30 to be pulled to yet a third position 33 as illustrated in FIG. 3 and to consequently permit the controller to move to a corresponding position. When this rod motion occurs, movement of the pistons 39 and 54 in the accommodating bore is also necessary. For the operator to provide relatively precise braking action, more than a nominal amount of pedal 61 travel and consequent rod 30 motion is required. To provide a brake system having desirable full yet proper pedal travel, the valve bore 27 has an axial length L which is here on the order of twice the bore diameter D. Thus, as the rod 30 and controller 60 move from their first to their second positions, only the primary brake subsystem is progressively energized; the secondary system actuator 72 is not engaged. As the rod 30 and controller 60 move from their second to their third positions, however, the secondary brake subsystem is also energized. The operator can note this secondary system energization by the relatively unusually depressed position of the brake pedal 61, but positive, powerful braking action nevertheless is assured.

In carrying out the invention, this ordered energization of braking subsystems is accomplished in an inexpensive yet logical manner. To this end, the controller 60 is journalled upon a fixed pivot member 80. An interconnector embossment 65 is located upon the same lever arm or side of the pivot 80 as is the brake pad engagement element 61. Thus, when the brake pad 61 is depressed, a secondary engagement boss 65 is urged toward the master cylinder rod 72.

To normally energize the primary braking system, a lever extension 67 of the controller 60 reaches beyond the pivot point 80 on an opposite lever side from the brake pad 61, and an interconnector pin 81 interconnects the controller extension 67 and the valve rod 30. If necessary or desired, intermediate linkages 85 can be provided to locate both the controller 60 and brake valve 10 at convenient positions upon the vehicle. To draw the controller 60 and the brake valve actuator rod 30 into normally inactive positions, a biasing element such as a spring 87 can be connected between the controllers 60 and an attachment element 88. Here, this biasing spring 67 is of the tensile type, and is connected between the element 88 and a point 89 on the same lever side of the pivot point 80 as the brake pad 61.

It is yet another feature of the invention that the embodiment disclosed here permits the ready interconnection of additional brake energizing sub-systems. For example, a mechanical linkage arrangement, such as a cable, can be connected between the controller 60 and a mechanically actuated brake such as a disc brake mounted upon a vehicle shaft or wheel. Hardware costs can be reduced and installation simplified in some cases by attaching the cable to the controller 60 at a point between the brake foot pad 61 and the controller pivot 80. If desired, the cable can be arranged so as to be fully tensioned when the controller moves into its second position, as described above. Mechanical brake actuation begins and becomes progressively more firm as the controller moves progressively from its second to its third position.

The invention is claimed as follows:

1. A brake system comprising a primary fluid power brake subsystem and a secondary brake subsystem, the primary fluid power brake subsystem including a power valve having a housing defining an elongate bore closed at one end by a fixed end wall, a bi-ended valve rod extending through the housing end wall to be slid between spaced apart first, second and third positions, the rod having a first end outside the housing and a second end disposed inside the housing bore, an apertured annular piston slidably disposed within the housing bore, the aperture defined by the annular piston including a flow space normally permitting power fluid to flow through the annular piston, a reaction piston carried on the second rod end and radially extending to cover the annular piston flow space and engagingly move toward the annular piston to halt the normal flow of fluid through the annular piston and create a moveable end wall, the moveable end wall, fixed end wall and bore defining a collapsible chamber in the power valve, the power valve further including a fluid output port communicating with the collapsible chamber, and the primary brake subsystem further including conduit means to direct power fluid from the collapsible chamber toward a brake when the rod is urged through the housing from the first toward the third rod positions and the chamber is collapsed, and brake system controller means connected to the rod and extending to an operator's station to permit the operator to move the controller and connected rod between corresponding first, second and third positions, the brake system further including a secondary brake system actuator normally located at the second rod and controller positions for progressively increasing secondary brake subsystem actuation as the rod and controller move from the second toward the third positions.

2. The brake system according to claim 1 wherein is defined an orifice between said annular piston and said reaction piston, rod movement from the first toward the second and third positions acting to close the orifice and raise the fluid pressure within said collapsible chamber.

3. The brake system according to claim 2 including conduit means extending from the collapsible chamber and said fluid outlet port to a low pressure fluid receiver, and wherein fluid normally moves through the valve collapsible chamber and open orifice when the reaction piston and annular piston are spaced apart from one another so as to deliver fluid from the chamber directly to the low pressure receiver without energizing the brakes under normal conditions.

4. A brake system according to claim 1 wherein said valve rod extends through said annular piston to define, between the annular piston and the rod, an annular flow space.

5. A brake system according to claim 1 wherein said cylinder bore has an axial length on the order of twice as long as the annular cylinder diameter so as to space apart said first, second and third rod and controller positions.

6. A brake system according to claim 1 including secondary brake system actuator rod engagement element means carried directly upon the brake system controller to cause the secondary brake system to be actuated directly by the controller.

7. A brake system according to claim 6 wherein said secondary brake system actuator is located in a position of non-engagement with said controller engagement element as said controller and said actuator rod move between said first and second positions.

8. A brake system according to claim 1 wherein said secondary brake system includes a secondary master cylinder, said secondary actuator rod extending into the master cylinder and having a piston end inside the cylinder, the secondary actuator rod slidable at least partly into and out of the master cylinder and extending through the cylinder to an actuator end located for engagement by the primary power cylinder rod and controller when the power cylinder rod and controller are located at their respective second positions, the secondary brake system further including at least one brake unit in fluid communication with the secondary master cylinder and adapted to provide, as fluid pressure in the secondary master cylinder rises, a progressively increasing braking action.

9. A brake system comprising a primary fluid power brake subsystem and a secondary brake subsystem, the primary fluid power brake system including a power brake valve having a power cylinder rod slidably extending therefrom for movement between spaced apart first, second and third positions, and brake system controller means connected to the rod and extending to an operator's station to permit the operator to move the rod and controller between corresponding first, second and third positions, the secondary brake subsystem including a secondary master cylinder and a bi-ended secondary actuator rod having a piston end inside the cylinder, the secondary actuator rod being slidable at least partly into and out of the master cylinder and extending from the cylinder to an actuator end located for engagement by the primary power cylinder rod and controller when the power cylinder rod and controller are located at their respective second positions, the secondary actuator rod being positioned for sliding progressive insertion into the secondary master cylinder after engagement by the power cylinder rod and controller as the power cylinder rod and controller progressively move from their second to their third positions, progressive secondary actuator rod insertion into the secondary master cylinder acting to progressively raise fluid pressure within that master cylinder, the brake system further including at least one brake unit in fluid communication with the secondary master cylinder and adapted to provide, as fluid pressure in the secondary master cylinder rises, a progressively increasing braking action.

10. A brake system according to claim 9 including a primary fluid power valve having a housing defining an elongate bore closed at one end by a fixed end wall, a bi-ended rod extending through the end wall to be slid between linearly spaced apart first, second and third positions, the rod having a first end outside the housing and a second end disposed inside the bore, an annular piston slidably disposed within the housing bore and defining an aperture, the aperture defined by the annular piston including a flow space permitting power fluid to flow therethrough when the brake is de-energized, a reaction piston carried on the second rod end and radially extending to cover the annular piston flow space and engagingly move toward the annular piston to halt the flow of fluid through the annular piston flow space and to create a moveable end wall, the moveable end wall, fixed end wall and bore defining a collapsible chamber, the service fluid power valve further including a fluid output port communicating with the collapsible chamber, and conduit means to direct power fluid from the collapsible chamber toward a brake unit when the rod is urged through the housing between the first and third rod positions and the chamber is consequently collapsed, and fluid pressure within the collapsible chamber is consequently raised.

11. A brake system according to claim 10 wherein said controller is journalled at a fixed point and includes an operating element and a secondary actuator rod engagement element located on the same lever arm side of the controller pivot point.

12. A brake system according to claim 11 wherein said primary valve bore is on the order of twice as long as the diameter of the annular piston so as to space apart said first, second and third points.

13. A brake system according to claim 11 wherein said controller includes a power cylinder rod interconnector element located on an opposite lever side of the controller pivot point.

14. A brake system according to claim 9 including biasing means for urging a controller and power cylinder rod into said first, inactive positions.

15. A brake system comprising a primary fluid power brake sub-system and a secondary brake sub-system, the primary fluid power brake system including a power brake valve having a power cylinder rod slidably extending therefrom for movement between spaced apart first, second and third positions, and brake system controller means connected to the rod and extending to an operator's station to permit the operator to move the rod and controller between corresponding first, second and third positions, the secondary brake subsystem including a mechanical brake and mechanical link means interconnecting the mechanical brake and the brake system controller, the link means being positioned to energize the mechanical brake when the power cylinder rod and controller are located at their respective second positions, the mechanical link means operating to progressively energize the mechanical brake as the power cylinder rod and controller progressively move from their second to their third positions.

* * * * *